(12) United States Patent
Grill

(10) Patent No.: US 6,681,515 B2
(45) Date of Patent: Jan. 27, 2004

(54) FISH NET HOLDING DEVICE AND METHOD THEREFOR

(76) Inventor: Harvey Grill, 2621 N. 71st Pl., Scottsdale, AZ (US) 85257

( * ) Notice: Subject to any disclaimer, the term of this patent is extended or adjusted under 35 U.S.C. 154(b) by 0 days.

(21) Appl. No.: 10/187,115

(22) Filed: Jun. 28, 2002

(65) Prior Publication Data

US 2004/0000085 A1 Jan. 1, 2004

(51) Int. Cl.[7] .............................................. A01K 77/00
(52) U.S. Cl. .............................................. 43/12; 43/11
(58) Field of Search ................... 43/12, 11, 7; D22/135

(56) References Cited

U.S. PATENT DOCUMENTS

| | | |
|---|---|---|
| 412,773 A | 10/1889 | Meisselbach |
| 440,568 A | 11/1890 | Hebard |
| 1,077,481 A | 11/1913 | Levy |
| 1,169,311 A | 1/1916 | Walter |
| 3,803,742 A | 4/1974 | Foster |
| 4,970,821 A | 11/1990 | Young |
| 5,276,989 A | 1/1994 | Lumb et al. |
| 5,617,668 A | 4/1997 | Shimandle |
| 5,651,141 A | 7/1997 | Schneider |
| 6,036,067 A | 3/2000 | Alcorn |
| 6,178,684 B1 | 1/2001 | Nyakas et al. |

*Primary Examiner*—Darren W. Ark
(74) *Attorney, Agent, or Firm*—Jeffrey D. Moy; Harry M. Weiss; Weiss, Moy & Harris, P.C.

(57) ABSTRACT

A holding device for a fishing net which will hold a net portion of the fishing net to a pole section to prevent the net portion of the fishing net from becoming tangled and caught on items. The holding device has a body section having a first end coupled to the pole section. Fasteners are coupled to the first end and a second end of the body section. The fasteners are used for securing the net portion of the fishing net to the pole section and for releasing the net portion of the fishing net when pressure is applied to the net portion.

5 Claims, 1 Drawing Sheet

FISH NET HOLDING DEVICE AND METHOD THEREFOR

BACKGROUND OF THE INVENTION

1. Field of the Invention

This invention relates to fishing gear, and more specifically, to a holding device for a landing/fishing net which will hold the net portion to the pole section in order to prevent the net section of the fishing net from becoming tangled and caught on items.

2. Description of the Prior Art

A landing/fishing net (hereinafter fishing net) is used to withdraw a fish from a body of water once the fish has been hooked and reeled in to the person fishing. Thus, the fishing net must be kept nearby when fishing. In general, a fisherman will lay the fishing net down on the ground when fishing from land or on the floor of the boat when fishing from a boat. Unfortunately, many times when the fisherman reaches down to pick up the fishing net to capture the caught fish, the net portion will become entangled on nearby objects. Many times, the net portion will become caught on a rock or other item and will tear when the user tugs on and tries to free the fishing net.

Because of the above problem, several patents have been obtained on collapsible fishing nets. These patents permit the net portion to be stored inside the handle in order to avoid the net from becoming tangled and torn. See U.S. Pat. No. 6,178,684; U.S. Pat. No. 1,077,481; and U.S. Pat. No. 440,508. These types of fishing nets have several problems associated with them. First, when the components of the net frame and the net are being inserted in the handle, the net is wrapped around such components. Wrapping the net around such components is relatively time consuming and inconvenient. Also, the action of wrapping the net around these components, particularly if this is done tightly, causes additional stress on the strings comprising the net, which over time results in degradation of the net. However, the biggest problem is that these fishing nets are too complex and difficult to use. When trying to land a fish, one does not want to have to take the time and energy to figure out how to reassemble the collapsible fishing net. Furthermore, if one is fishing alone, reassembly of the collapsible fishing net will generally take both hands. Thus, the fisherman will have to take his hands off the pole.

Therefore, a need existed to provide a device to store and hold the net portion of the fishing net. The device must hold the net portion of the fishing net so that the net portion will not become tangled and torn. The device must further be able to release the net portion of the fishing net so that one can easily land the fish.

SUMMARY OF THE INVENTION

In accordance with one embodiment of the present invention, it is an object of the present invention to provide a device to store and hold a net portion of a fishing net.

It is another object of the present invention to provide a device that holds the net portion of the fishing net so that the net portion will not become tangled and torn.

It is still another object of the present invention to provide a device that is able to release the net portion of the fishing net so that one can easily land the fish.

BRIEF DESCRIPTION OF THE EMBODIMENTS

In accordance with one embodiment of the present invention a holding device for a fishing net which will hold a net portion of the fishing net to a pole section to prevent the net portion of the fishing net from becoming tangled and caught on items is disclosed. The holding device has a body section having a first end coupled to the pole section. Fasteners are coupled to the first end and a second end of the body section. The fasteners are used for securing the net portion of the fishing net to the pole section and for releasing the net portion of the fishing net when pressure is applied to the net portion.

In accordance with another embodiment of the present invention a method for securing a net portion of the fishing net to a pole section to prevent the net portion of the fishing net from becoming tangled and caught on items and for releasing the net portion to land a fish is disclosed. The method comprises the steps of: securing a net holding device to the pole section of the fishing net; positioning the net portion under the pole member; wrapping the holding device around the pole member so the net portion is against the pole member; and engaging couplers on each end of the net holding device to secure the net portion against the pole member.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

FIG. 3 is a top view of the fish net holding device of the present invention.

DETAILED DESCRIPTION OF THE PREFERRED EMBODIMENT

Figure 1:
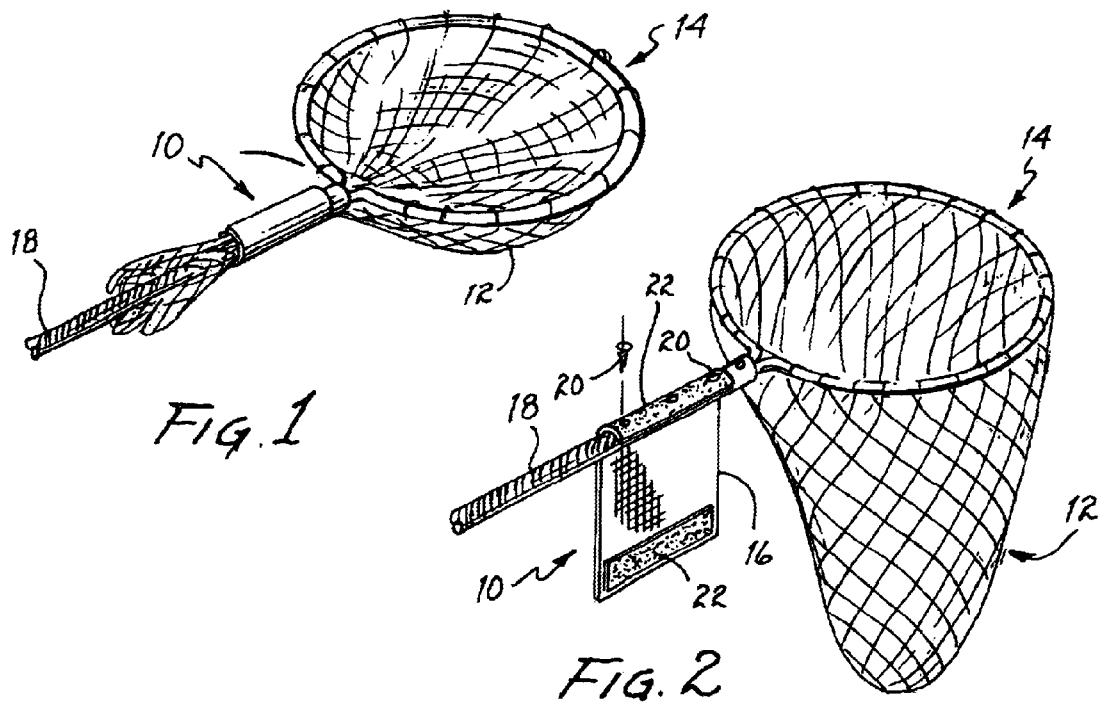
FIG. 1 is an elevated perspective view of the fish net holding device of the present invention with the net portion of the fishing net in a stored position.

Referring to FIGS. 1–4, a fish net holding device 10 is shown. The fish net holding device 10 (hereinafter device 10) is used to hold the net portion 12 of the fishing net 14 so that the net portion 12 will not become tangled and torn on nearby objects. The device 10 is able to easily release the net portion 12 of the fishing net 14 so that one can easily land a fish.

The device 10 has a body section 16. The body section 16 is generally made from a flexible, yet durable piece of material. The material may be water resistant or covered with a water resistant coating. Some examples of the material to be used may be a cloth, vinyl, nylon, and the like. It should be noted that the listing of the above mentioned materials is just used as an example and should not be seen as to limit the scope of the present invention.

The body section 16 is generally rectangular in shape. However, this should not be seen as to limit the scope of the present invention. Other shapes and figures may be used without departing from the spirit and scope of the present invention. One end of the body section 16 is attached to a pole member 18 of the fishing net 14. The body section 16 is coupled to the pole member 18 by one or more connectors 20. The connectors 20 may be rivets, self tapping screws, or the like. It should be noted that these are just given as examples and should not be seen as to limit the scope of the present invention.

The body section 16 has couplers 22 attached to each end of the body section 16. The couplers 22 allow one end of the body section 16 to be removably coupled to another end of the body section 16. In the embodiment depicted in the Figures, the couplers 22 have a first section 22A which is coupled to a front surface of the body section 16. A second section 22B is coupled to a rear surface of the body section 16. When the body section 16 is wrapped around the pole member 18, the rear surface of the body section 16 will come into contact with the front surface of the body section 16. Thus, the couplers 22 will engage one another. By applying pressure to the couplers 22, the couplers 22 will disengage thus allowing one end of the body section 16 to be removably coupled to another end of the body section 16. The couplers 22 may be snaps, hook and loop material, or the like. It should be noted that the listing of the above couplers 22 should not be seen as to limit the scope of the present invention.

Method of Use

Referring to FIGS. 1–4, a method of using the device 10 will be disclosed. When using the device 10, the net portion 12 of the fishing net 14 is gathered and positioned under the pole member 18. The device 10 is wrapped around the pole member 18 and holds the net portion 12 against the pole member 18 as shown in FIG. 1. When the device 10 is wrapped around the pole member 18, the rear surface of the body section 16 will come into contact with the front surface of the body section 16. Thus, the couplers 22 on each end of the body section 16 will engage one another holding the net portion 12 against the pole member 18. Thus, the net portion 12 will not get caught and tangled on items near the fishing net 14.

Figure 2:
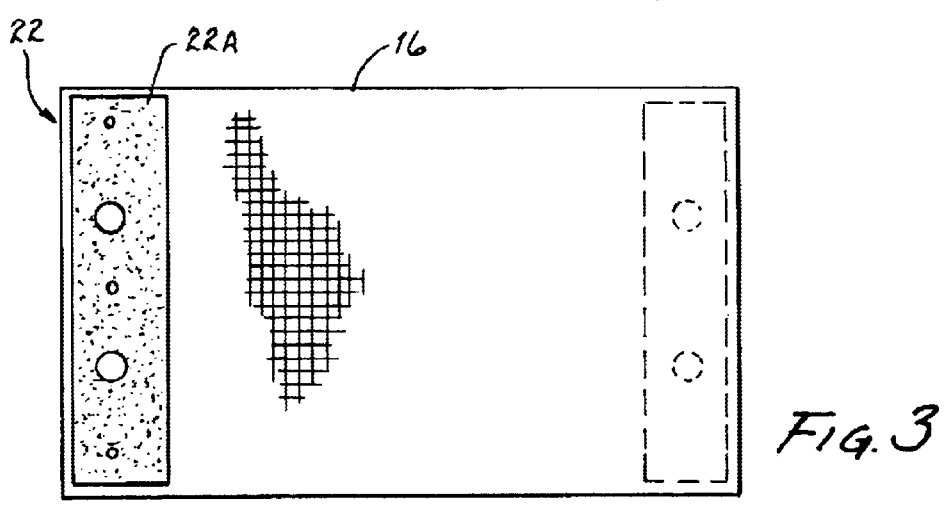
FIG. 2 is an elevated perspective view of the fish net holding device of the present invention with the net portion of the fishing net in a released position.
Figure 4:
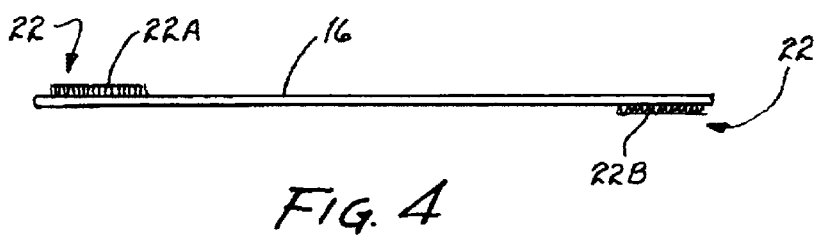
FIG. 4 is a side view of the fish net holding device of the present invention.

When a fish is caught, the fisherman will grab the fishing net 14 by the pole member 18. Since the net potion 12 is secured against the pole member 18, the net portion 12 will not get caught and tangled on nearby items. The fisherman can then capture the fish in the net portion 12. The force of scooping up the fish plus the weight of the fish will apply enough pressure to the couplers 22 to cause the couplers 22 to disengage. Thus, the net portion 12 will become fully extended as shown in FIG. 2 with the fish captured in the bottom of the net portion 12.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A fishing net in combination with a holding device, comprising:

a) a fishing net having a pole section and a net portion coupled to the pole section;

b) a holding device for holding the net portion to the pole section to prevent the net portion from becoming tangled and caught on items and releasing the net portion when the fishing net is used to capture a fish, the holding device comprising:

1) a generally rectangular body section with a first end, a second end opposite the first end, and an intermediate portion between the first and second ends, the first end being immovably attached to the pole section using connectors that extend through the first end of the body section to the pole section such that the first end extends generally parallel to the pole section;

2) fasteners for securing the net portion to the pole section and for releasing the net portion when pressure is applied to the net portion when capturing a fish, wherein the fasteners comprise:

a first fastener attached to the first end on a front surface of the body section;

a second fastener attached to the second end on a rear surface of the body section;

wherein when the net portion is to be held by the holding device, the intermediate portion of the body section is wrapped around both the pole member and the net portion after the net portion is positioned under the pole section, and then the first fastener and second fastener are engaged with each other so as to removably couple the first end of the body section to the second end of the body section to thereby hold the net portion to the pole section, the first and second fasteners will disengage when pressure is applied to the net portion when capturing a fish in the net portion to allow the net portion to become fully extended.

2. A fishing net in combination with a holding device in accordance with claim 1 wherein the body section is made from a water resistant material.

3. A fishing net in combination with a holding device in accordance with claim 1 wherein the body section is coated with a water resistant material.

4. A fishing net in combination with a holding device in accordance with claim 1 wherein the fasteners comprises hook and loop material.

5. A fishing net in combination with a holding device in accordance with claim 1 wherein the fasteners comprise snaps.

\* \* \* \* \*